United States Patent [19]

Kurokawa

[11] 4,432,441

[45] Feb. 21, 1984

[54] VIBRATION ISOLATION APPARATUS

[75] Inventor: Masahito Kurokawa, Yokohama, Japan

[73] Assignee: Kokka Kogyo Kabushiki Kaisha, Tokyo, Japan

[21] Appl. No.: 356,691

[22] Filed: Mar. 10, 1982

[30] Foreign Application Priority Data

Apr. 13, 1981 [JP] Japan .................................. 56-54407

[51] Int. Cl.³ ............................ F16F 6/00; F16F 7/00; F16F 13/00
[52] U.S. Cl. .................................... 188/267; 188/379; 267/140.1
[58] Field of Search ........................ 188/267, 378–380; 280/670, 697; 248/638; 267/140.1, 137

[56] References Cited

U.S. PATENT DOCUMENTS

| 3,088,062 | 4/1963 | Hudimac | 188/378 |
| 3,770,290 | 11/1973 | Bottalico | 188/267 X |
| 4,314,623 | 2/1982 | Kurokawa | 188/267 |

FOREIGN PATENT DOCUMENTS 2097096 10/1982 United Kingdom ............. 267/140.1

Primary Examiner—Douglas C. Butler
Attorney, Agent, or Firm—Jordan and Hamburg

[57] ABSTRACT

A vibration isolation apparatus includes upper and lower, axially magnetized permanent magnets, which are disposed on a common axis and present poles of a like polarity on their opposing surfaces. The magnetic repulsion acting between the magnets maintains the upper one of them in suspension, on which is placed an instrument or member which is to be isolated from oscillations. In their central region, the magnets carry upper and lower bearing members which are disposed on the common axis and through which a connection shaft of a magnetizable material extends. The upper end of the connection shaft is provide with a flange, which is tightly fitted into a cylindrical opening formed in a threaded shank mounted on the upper magnet, thereby defining air damper to suppress a free oscillation of the upper magnet.

6 Claims, 2 Drawing Figures

VIBRATION ISOLATION APPARATUS

FIELD OF THE INVENTION

The invention relates to a vibration isolation apparatus for protecting an instrument or member placed thereon against external oscillations transmitted thereto, and more particularly, to an improvement of such vibration isolation apparatus which utilizes a magnetic repulsion occurring between a pair of permanent magnets having their poles of like polarity disposed in opposing relationship with each other.

A precision instrument such as a record player, an electronic computer, a microscope or a roughness meter must be protected from external oscillations in order to prevent their malfunctioning. Also, in nuclear power plants or chemical plants, it is necessary that pipings interconnecting various units be protected against external oscillations. At this end, a vibration isolation apparatus is interposed between a mount and an instrument or member such as piping which is to be protected, thus isolating or attenuating external oscillations. A vibration isolation apparatus may utilize elastic materials such as sponge, rubber or metal springs, which however is subject to corrosion or fatigue over a prolonged period of use. To accommodate for this, there has recently been proposed a vibration isolation apparatus which utilizes a magnetic repulsion occurring between a pair of permanent magnets having their N- or S-poles disposed in opposing relationship with each other. In this apparatus, one of the permanent magnets is maintained in suspension as a result of such repulsion, and an instrument or member which is to be protected against oscillations is placed on this permanent magnet. Since the demagnetization of permanent magnets is minimal after a prolonged period of use, a stable performance is assured which is little affected by aging effect, as compared with the use of elastic materials mentioned above.

DESCRIPTION OF THE PRIOR ART

A vibration isolation apparatus utilizing permanent magnets is specifically disclosed in pending U.S. patent application Ser. No. 117,737 filed Feb. 1, 1980, now U.S. Pat. No. 4,314,623, by the same inventor as the present application and entitled "Vibration Isolation Apparatus." This apparatus includes an upper and a lower annular magnet assembly which are axially magnetized. These magnet assemblies are disposed on a common axis so that their opposing surfaces present poles of like polarity. Except for the opposing surfaces, the remaining surfaces of the both assemblies are covered by yoke members of a magnetizable material, so that the magnetic flux across the both assemblies is concentrated between the opposing surfaces to produce a magnetic repulsion of an increased magnitude. A single connecting shaft of magnetizable material is passed through the center of the both assemblies, and is magnetized by these assemblies, whereby it is supported in suspension without being magnetically attracted to one of the assemblies. The connecting shaft maintains a coaxial relationship between the opposing assemblies while preventing oscillations applied to or occurring in one of the assemblies from being transmitted to the other assembly. In addition, an elastic material is interposed between the connecting shaft and the both assemblies in this apparatus to absorb horizontal components of oscillations.

In order that an instrument which is to be protected against oscillations be supported in suspension, a vibration isolation apparatus of the kind described has an increased compliance to provide a satisfactory anti-vibration effect, but suffers from a disadvantage that a free oscillation which has once occurred in response to external shocks continues over an increased length of time without being effectively attenuated.

SUMMARY OF THE INVENTION

It is an object of the invention to provide an improvement of a vibration isolation apparatus of the type described which utilizes permanent magnets, and wherein an instrument which is to be protected against oscillations is positively isolated from oscillations occurring in or on a floor.

It is another object of the invention to provide a vibration isolation apparatus capable of rapidly attenuating a free oscillation ocurring as a result of a magnetic repulsion between a pair of permanent magnets when an oscillation is applied to the apparatus.

In accordance with the invention, there is provided a vibration isolation apparatus comprising a pair of upper and lower casings each having a cylindrical opening which has its open end located opposite to each other, a pair of substantially cup-shaped upper and lower yoke members of a magnetizable material which are disposed within the respective cylindrical openings of the both casings and having their open ands located opposite to each other, a pair of upper and lower permanent magnets disposed within the upper and the lower yoke member, respectively, each of the magnets being vertically magnetized and centrally formed with an opening vertically passing therethrough, the openings being aligned with each other on a common axis, and the opposing surfaces of the both magnets presenting magnetic poles of a like polarity, a pair of upper and lower bearing members of a non-magnetic material disposed in the openings of the both magnets, the both bearing members having openings which are aligned with the common axis, a connection shaft of a magnetizable material loosely fitted in the openings formed in the bearing members for coupling the pair of permanent magnets together in a manner such that one of the permanent magnets is axially slidable independently from the other permanent magnet, and air damping means including a collar member secured to at least one end of the connecting shaft and a hollow cylinder formed in one of the upper and lower casings which is located adjacent to the collar member and having an opening in which the collar member is tightly fitted.

In a desirable embodiment of the invention, a non-magnetic, elastic cushioning ring is placed between the bottoms of a lower casing and a lower yoke member, and has its peripheral surface surrounded by the inner surface of the lower casing in which a recess is formed to allow a deformation of the cushioning ring.

In the vibration isolation apparatus of the invention, both the upper and the lower permanent magnet have their peripheral surfaces and major surfaces, located opposite from the opposing surfaces, covered by yoke members, thus preventing a leakage flux therebetween. As a result, an external magnetic field is concentrated across the opposing surfaces of the both magnets. In this manner, a magnetic repulsion of an increased magnitude is achieved as compared with the prior art. The connection shaft which maintains the magnets in opposing relationship is formed of a magnetizable material, and thus defines part of the magnetic path, and poles of dissimilar polarities are induced in the connection shaft and in the upper and the lower yoke member in regions which define an interface therebetween. As a consequence, a magnetic attraction is produced therebetween to maintain a given length of projection of the connection shaft above a lid of the upper yoke member and below the bottom of the lower yoke member. In this manner, the both yoke members serve a magnetic shielding effect, increasing the magnetic repulsion and the suppression of free oscillations.

At least one end of the connection shaft carries a collar member, and a corresponding one of the upper or the lower permanent magnet is provided with a hollow cylinder having an opening in which the collar member is tightly inserted. The combination of the collar member and the opening functions as an air damper, thus suppressing free oscillations of the upper permanent magnet. In accordance with another aspect of the invention, an elastic cushioning ring is inserted between the bottom of the lower casing and the lower yoke member, whereby an oscillation system resulting from the magnetic repulsion of the pair of permanent magnets and another oscillation system occurring due to the resilience of the cushioning ring are connected in series with each other to produce a pair of resonance points, thereby providing an increased magnitude of attenuation.

Other objects, functions and effects of the vibration isolation apparatus of the invention will become apparent from the following description of an embodiment thereof with reference to the drawings.

BRIEF DESCRIPTION OF THE DRAWINGS

FIG. 1 is a perspective view of a vibration isolation apparatus according to one embodiment of the invention; and FIG. 2 is a longitudinal section of FIG. 1.

DESCRIPTION OF A PREFERRED EMBODIMENT

Referring to the drawings, there is shown a lower casing having a generally cylinderical appearance and which is generally designated by reference numeral 11. The casing 11 includes a sidewall 12 and a bottom 13, both of which define a bottom retainer vessel 14 formed of a non-magnetic, hard rubber, for example, and having a cylindrical opening defined therein. A protective ring 15 of a non-magnetic material such as aluminium is applied to the outer surface of the sidewall 13 of the vessel. Also, an annular member 16 is secured to the lower surface of the bottom 13 of the vessel 14 as by adhesion or staking in order to protect the lower surface thereof. The bottom 13 is centrally formed with a threaded bore 18 in which a cap 17 of a non-magnetic material such as aluminium is threadably engaged. An annular metal plate 20 is mounted in the cylindrical opening of the vessel 14 and is centrally formed with a threaded bore 19 which is engaged by the cap 17. The cap 17 is firmly secured to the casing 11 by its threadable engagement with the threaded bores 18, 19 formed in the bottom 13 and the metal plate 20, respectively. The cap 17 may be replaced by a mounting screw, which is used to fix the casing 11 to a floor surface or the like. A cushioning ring 21 having a rectangular cross section and formed of rubber or synthetic resin is placed on top of the metal plate 20. Recess 22 is formed in the inner peripheral surface of the sidewall 12 of the vessel 14 in opposing relationship with the lateral side of the cushioning ring 21 to permit a deformation of the latter. A cup-shaped, lower yoke member 23 is placed on top of the cushioning ring 21 so as to be vertically slidable within the cylindrical opening of the vessel 14. It is to be noted that the axis of the lower yoke member 23 is aligned with the opening of the vessel 14, and the yoke member is formed of a magnetically soft material such as iron to have a bottom 24 and an upstanding side 25 integrally formed.

Figures 1, 2:
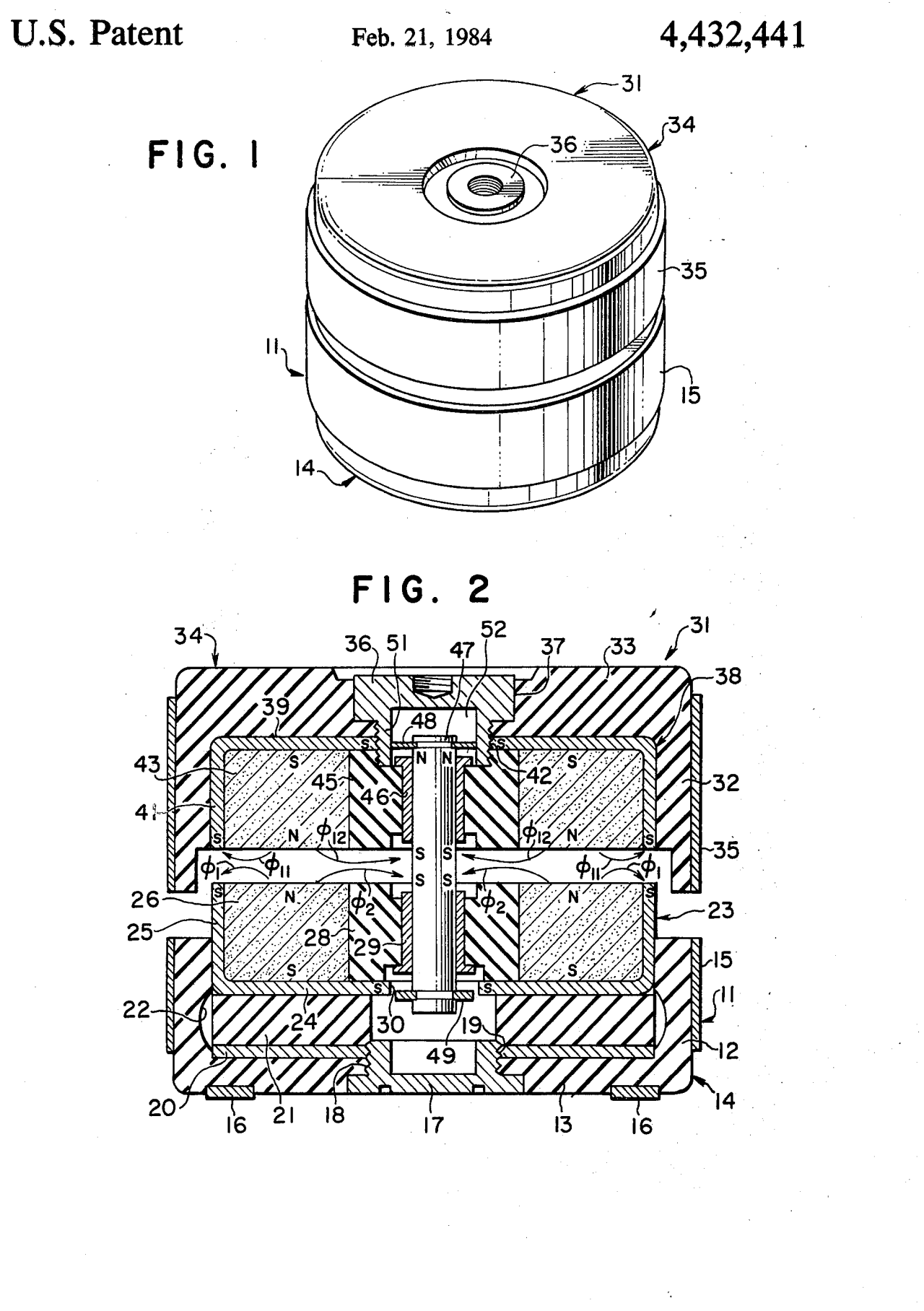

The lower yoke member 23 receives an annular, lower permanent magnet 26 having a rectangular cross section, which is tightly secured to the bottom 24 of the yoke member. The outer peripheral surface of the magnet is located opposite to the upstanding side 25 of the yoke member 20. The magnet 26 has its axis aligned with the yoke member 23, and is formed of a magnetically hard material such as strontium ferrite or the like. As shown in FIG. 2, the magnet is magnetized to present an N-pole on its upper end face and an S-pole on its lower end face. As a result, the yoke member 23 is magnetized to present an S-pole on the upper end face of the side 25, forming a magnetic path extending from the upper end face of the magnet 26 through the upper and the lower end face of the side 25 and through the bottom 24 to the lower end face of the magnet 26. Located within a central opening of the magnet 26 is fitted an elastic ring 28 formed of rubber or synthetic resin, and located within a central opening of the ring 28 is a lower sleeve 29 of a non-magnetic metal such as oilless metal having an axial length which is less than the axial length of the ring 28. The upper end faces of the magnet 26 and the ring 28 are substantially flush with the upper end face of the side 25 of the lower yoke member 23, which in turn projects above the sidewall 21 of the vessel 14. It will be noted that the bottom 24 of the yoke member 23 is centrally formed with an opening 30, which is aligned with the axis of the yoke member 23 together with the central opening of the ring 28 and the lower sleeve.

An upper casing is generally designated by reference numeral 31, and has a substantially cylindrical appearance similar to the lower casing 11. The upper casing 31 includes a sidewall 32 and a lid 33, formed of a similar material as that used to define the vessel 14 and forming an upper retainer vessel 34 in which a cylindrical opening is formed. A protective ring 35 of a non-magnetic material such as aluminium is secured to the outer peripheral surface of the vessel 34. The axis of the opening in the upper casing 31 is aligned with the axis of the opening formed in the lower casing 11, and the open end of the opening in the upper casing is disposed opposite to the open end of the opening in the lower casing 11. It will be noted that the lower ends of the protective ring 35 and the sidewall 32 extend so as to surround the upper end of the lower yoke member 23. The lid 33 is centrally formed with a threaded bore 37, into which an upper cap 36 of a non-magnetic material is rotatably disposed. An upper yoke member 38 is disposed in and secured within the opening of the vessel 34, and has its open end located opposite to the open end of the lower yoke member 23. As shown, the upper yoke member 38 is in the form of an inverted cup including a lid 39 and a downwardly depending side 41. It is formed of a magnetically soft material similar to that used to form the lower yoke member 23, and has a diameter and an axial length, both of which are quite the same as those of the lower yoke member 23. The axis of the yoke member 38 is aligned with the axis of the lower yoke member 23. The upper yoke member 38 is centrally formed with a threaded bore 42 which receives the upper cap 36.

An annular, upper permanent magnet 43 having a rectangular cross section and formed of a magnetically hard material similar to that used to form the lower permanent magnet 26 is tightly secured to the lid 39 within the opening of the upper yoke member 38, and has its outer peripheral surface located opposite to the side 41. Also, the magnet 43 has a central opening, which is aligned with that of the lower magnet 26. As shown in FIG. 2, the upper magnet 43 is magnetized to present an S-pole and an N-pole on its upper and lower end faces, respectively, and this causes the lower end of the side 41 of the upper yoke member 38 to be magnetized to an S-pole, thus forming a magnetic path extending from the lower end face of the magnet 43 through the lower end face and the upper end of the side 41 and through the lid 39 to return to the upper end face of the upper magnet 43. An upper elastic ring 45, formed of a similar material as the lower ring 28, is secured within the central opening of the permanent magnet 43 as by adhesion or staking. The elastic ring 45 has a central opening, into which is fitted an upper sleeve 46 of the same configuration and material as the lower sleeve 29, and both the ring 45 and the sleeve 46 are aligned with the axis of the lower sleeve 29.

A connection shaft 47 of a magnetically soft material such as iron extends through the upper and the lower sleeve 46, 29. The shaft 47 has a diameter less than the inner diameter of the both sleeves 29, 46, and has an axial length which is sufficient to prevent the withdrawal of the lower end thereof from the lower sleeve 29 if the upper magnet 43 lifts away from the lower magnet 26 as a result of a magnetic repulsion produced between the both magnets when the vibration isolation apparatus is unloaded. The lower magnet 26 magnetizes a region of the lower yoke member 24 adjacent to the opening 30 to an S-pole while the upper magnet 43 magnetizes a region of the upper yoke member 38 adjacent to the threaded bore 42 to an S-pole. Consequently, the connection shaft 47 is magnetized in a manner such that its upper and lower ends are magnetized to N-poles while its central portion is magnetized to an S-pole. As a result, the connection shaft 47 is maintained in suspension without being magnetically attracted to either magnet. A disc-shaped flange member 48 of a diameter greater than the upper sleeve 46 is secured to the upper end of the connection shaft 47 while an E-washer 49 is secured to the lower end thereof. The purpose of the washer 49 is to prevent the withdrawal of the shaft 47 from the lower sleeve 29, and may be replaced by a pin.

The lower portion of the upper cap 36 is formed with a shank 51 which is peripherally threaded so as to be engaged with the threaded bores 37, 42 formed in the vessel 34 and the upper yoke member 38, respectively. A cylindrical opening 52 which opens downwardly is formed in the shank 51, and has an inner diameter which is slightly reater then the outer diameter of the flange member 48. The purpose of the flange member 48 is to confine a quantity of air within the cylindrical opening 52 so that the combination of the flange member 48 and the cylindrical opening 52 functions as an air damper.

In operation, the lower casing 11 is placed on the floor, and an instrument to be protected against oscillations is placed on top of the upper casing 31. The weight of the instrument placed tends to lower the upper magnet 43. However, the lower surface of the upper magnet 43 and the upper surface of the lower magnet 26 are both N-poles and located opposite to each other, and the end faces of the sides 41, 25 of the upper and the lower yoke member 38, 23 are both S-poles and located opposite to each other. Accordingly, a magnetic flux $\phi_{11}$ from the N-pole of the upper magnet 43 passes to the S-pole on the side 41 of the upper yoke member 38 and thence through the lid 39 of the upper yoke member 38 to return to the the S-pole of the upper magnet 43, thus closing the magnetic circuit. On the other hand, a magnetic flux $\phi_1$ from the N-pole of the lower magnet 26 passes through the side 25 and the bottom 24 of the lower yoke member 23 to return to the S-pole of the magnet 26, similarly closing the magnetic circuit. The upper and the lower yoke member 38, 23 concentrate the external magnetic field produced across the both magnets 43, 26 into a region defined between their opposing surfaces, whereby the upper magnet 43 is subject to a magnetic repulsion of an increased magnitude to support the upper casing 31 carrying a precision instrument thereon in suspension. In this manner, the transmission of vertical oscillations from the floor surface is prevented. The provision of the pair of magnets 43, 26 alone is insufficient to produce a restoring force against a horizontal displacement of the upper magnet 43, and hence the both magnets 43, 26 cannot be maintained in their opposing relationship. The connection shaft 47 serves this purpose. Specifically, the connection shaft 47 constrains the both magnets against a horizontal movement so that they can be maintained in coaxial relationship.

In addition, the connection shaft 47 serves restricting a free oscillation. Specifically, when a downward impact is applied to the upper casing 31, the upper magnet 43 moves toward the lower magnet 26 to thereby increase the magnitude of the repulsion acting therebetween, thus returning the upper casing 31 back. The resulting upward movement will overshoot by inertia to cause a downward movement, thus producing a free oscillation. However, in the vibration isolation apparatus of the invention, there occures a relative movement between the connection shaft 47 and the upper and the lower casing 31, 11. Thus, as the upper casing 31 moves downward, the upper end of the connection shaft 47 will increase its projection length above the lid 39 of the upper yoke member 38 while its lower end will have an increased projection length below the bottom 24 of the lower yoke member 23. These projection lengths decrease during an upward movement of the upper casing 31.

Since the connection shaft 47 is formed of a magnetizable material, it forms magnetic paths for magnetic fluxes $\phi_2$, $\phi_{12}$ passing to the central portion thereof from the N-poles of the magnets 43, 26. In this manner, magnetic poles as indicated in FIG. 2 are induced. As a result, a magnetic attraction is produced between the bottom 24 of the lower yoke member 23 and the connection shaft 47 and between the lid 39 of the upper yoke member 38 and the connection shaft 47. Such magnetic attraction acts to suppress an increase in the projection lengths of the connection shaft 47 from the stable condition shown, and also acts to suppress a reduction in the projection lengths thereof. In this manner, a free oscillation of the upper casing 31 is suppressed.

The connection shaft 47 carries the flange member 48 which is located within the cylindrical opening 52 defined inside the threaded shank 51 of the upper cap 36, thus acting as an air damper. Consequently, a relative movement of the connection shaft 47 with respect to the upper casing 31 is also suppressed by the air damper effect. It is to be understood that such air damper may be formed between the lower end of the connection shaft 47 and the lower cap 17. Alternatively, the air dampers may be provided at the opposite ends of the connection shaft 47.

From the foregoing, it will be seen that in the vibration isolation apparatus of the invention, a vibration system resulting from the magnetic repulsion acting between the pair of magnets 43, 26, and another vibration system resulting from the elasticity of the cushioning ring 21 are connected in series, thus producing a pair of resonance points. As a result, when oscillations are applied to the lower casing 31, the oscillation of the lower casing 31 will be attenuated by a greager magnitude as compared with the attenuation achieved with either the repulsion alone or the elasticity of the cushioning ring 21 alone. In particular, the cushioning ring 21 has an annular configuration and has a rectangular cross section, both of which are effective to suppress a lateral vibration. Recess 22 formed in the inner surface of the sidewall 12 of the vessel 14 allows a deformation of the cushioning ring 21 to expand laterally as it is depressed, whereby such deformation is freely allowed to enable a smooth vibration attenuating effect.

What is claimed is:

1. A vibration isolation apparatus comprising
   a pair of upper and lower casings each having a cylindrical opening which has its open end located opposite to each other;
   a pair of substantially cup-shaped upper and lower yoke members of a magnetizable material which are disposed within the respective cylindrical openings of the both casings and having their open ends located opposite to each other;
   a pair of upper and lower permanent magnets disposed within the upper and the lower yoke member, respectively, each of the magnets being vertically magnetized and centrally formed with an opening vertically passing therethrough, the openings being aligned with each other on a common axis, and the opposing surfaces of the both magnets presenting magnetic poles of a like polarity;
   a pair of upper and lower bearing members of a nonmagnetic material disposed in the openings of the both magnets, the both bearing members having openings which are aligned with the common axis;
   a connection shaft of a magnetizable material loosely fitted in the openings formed in the bearing members for coupling the pair of permanent magnets together in a manner such that one of the permanent magnets is axially slidable independently from the other permanent magnet;
   and air damping means including a collar member secured to at least one end of the connecting shaft and a hollow cylinder formed in one of the upper and lower casings which is located adjacent to the collar member and having an opening in which the collar member is tightly fitted.

2. A vibration isolation apparatus according to claim 1, further including an elastic cushioning member interposed between the lower yoke member and the lower casing, the cushioning member having an opening extending therethrough which is aligned with the common axis, the lower yoke member being disposed on the lower casing so as to be vertically movable.

3. A vibration isolation apparatus according to claim 1 in which each of the upper and lower bearing members comprises an elastic ring of a non-magnetic material disposed in the opening of the associated magnet and having an opening vertically passing therethrough in alignment with the common axis, and a sleeve of a non-magnetic metal disposed in the opening of the elastic ring.

4. A vibration isolation apparatus according to claim 1 in which the collar member is secured to the upper end of the connection shaft and the cylinder is formed on the lower end of a cap which is used to secure an instrument mounted on the upper casing and which is to be isolated from oscillations.

5. A vibration isolation apparatus according to claim 2 in which the outer peripheral surface of the elastic cushioning member is opposing to the inner surface of the lower casing in which a recess is formed to permit a deformation of the elastic ring.

6. A vibration isolation apparatus according to claim 2 or 5 in which the elastic cushioning member has a rectangular cross section and has its outer peripheral surface configured to be commensurate with the periphery of the lower yoke.

* * * * *